United States Patent
Schuster et al.

(10) Patent No.: US 6,804,224 B1
(45) Date of Patent: Oct. 12, 2004

(54) SYSTEM AND METHOD FOR PROVIDING TELEPHONE SERVICE HAVING PRIVATE BRANCH EXCHANGE FEATURES IN A VOICE-OVER-DATA NETWORK TELEPHONY SYSTEM

(75) Inventors: Guido M. Schuster, Des Plaines, IL (US); Ikhlaq S. Sidhu, Vernon Hills, IL (US); Jerry J. Mahler, Prospect Heights, IL (US); Frederick D. Dean, Chicago, IL (US); Jacek A. Grabiec, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/515,365

(22) Filed: Feb. 29, 2000

(51) Int. Cl.⁷ .............................................. H04L 12/66
(52) U.S. Cl. ..................... 370/352; 370/401; 370/230; 379/88.17; 379/88.21
(58) Field of Search ......................... 379/88.17, 90.01, 379/93.01; 370/338, 352–353, 354, 400, 401, 395.2, 230, 389, 427

(56) References Cited

U.S. PATENT DOCUMENTS

| | | | | |
|---|---|---|---|---|
| 4,313,035 A | 1/1982 | Jordan et al. | ................. | 179/18 |
| 4,953,198 A | 8/1990 | Daly et al. | .................... | 379/61 |
| 4,973,837 A | 11/1990 | Bradbeer | ................... | 250/221 |
| 5,428,663 A | 6/1995 | Grimes et al. | ................ | 379/57 |
| 5,448,623 A | 9/1995 | Wiedeman et al. | ......... | 455/430 |
| 5,471,616 A | 11/1995 | Johnson et al. | ............. | 395/700 |
| 5,497,339 A | 3/1996 | Bernard | .................. | 364/705.05 |
| 5,557,658 A | 9/1996 | Gregorek et al. | ............. | 379/67 |

(List continued on next page.)

FOREIGN PATENT DOCUMENTS

| | | | | |
|---|---|---|---|---|
| DE | 198 13 179 A 1 | 9/1999 | ............ | H04M/1/00 |
| EP | 0 578 374 A1 | 8/1993 | .......... | H04M/11/00 |
| EP | 0 704 788 A2 | 4/1996 | ............. | G06F/1/16 |

(List continued on next page.)

OTHER PUBLICATIONS

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

(List continued on next page.)

*Primary Examiner*—Dang Tan
*Assistant Examiner*—Tri H. Phan
(74) *Attorney, Agent, or Firm*—McDonnell Boehnen Hulbert & Berghoff LLP

(57) ABSTRACT

A system and method for providing telephone service to a user of a telecommunications device using a data network service provider. The data network service provider has a local service host that is accessible by a local access identifier. A caller uses a telecommunications device to dial the local access identifier to connect to the local service host. In response to a prompt, the caller dials a telephone extension that identifies the callee's telecommunications device. The local service host receives the telephone extension and verifies that the callee is a subscriber. The local service host then retrieves the gateway nearest the callee telecommunications device and opens a voice-over-data channel between the callee and caller gateways. The telephone conversation then proceeds between the callee and caller telecommunications devices over a public switched telephone network connection to the caller gateway, the voice-over-data channel and the PSTN connection to the callee telecommunications device.

4 Claims, 6 Drawing Sheets

U.S. PATENT DOCUMENTS

| | | | |
|---|---|---|---|
| 5,563,937 A | | 10/1996 | Bruno et al. .................. 379/201 |
| 5,606,594 A | | 2/1997 | Register et al. ............... 379/58 |
| 5,646,945 A | | 7/1997 | Bergler ........................ 370/419 |
| 5,724,412 A | * | 3/1998 | Srinivasan ............... 379/93.23 |
| 5,727,057 A | | 3/1998 | Emery et al. ................ 379/211 |
| 5,732,074 A | | 3/1998 | Spaur et al. ................. 370/313 |
| 5,732,216 A | | 3/1998 | Logan et al. ........... 395/200.33 |
| 5,742,905 A | | 4/1998 | Pepe et al. ................... 455/461 |
| 5,838,665 A | | 11/1998 | Kahn et al. .................. 370/260 |
| 5,850,433 A | | 12/1998 | Rondeau ..................... 379/201 |
| 5,875,405 A | | 2/1999 | Honda ......................... 453/564 |
| 5,894,473 A | | 4/1999 | Dent ........................... 370/342 |
| 5,894,595 A | | 4/1999 | Foladare et al. ............. 455/414 |
| 5,915,008 A | | 6/1999 | Dulman ....................... 379/201 |
| 5,918,172 A | | 6/1999 | Saunders et al. ............ 455/404 |
| 5,930,700 A | | 7/1999 | Pepper et al. ................ 455/414 |
| 5,933,778 A | | 8/1999 | Buhrmann et al. ......... 455/461 |
| 5,938,757 A | | 8/1999 | Bertsch ......................... 712/36 |
| 5,960,340 A | | 9/1999 | Fuentes ....................... 455/417 |
| 5,970,059 A | | 10/1999 | Ahopelto et al. ............ 370/338 |
| 5,991,394 A | | 11/1999 | Dezonno et al. ............ 379/265 |
| 6,006,272 A | | 12/1999 | Aravamudan et al. ...... 709/245 |
| 6,031,904 A | | 2/2000 | An et al. ...................... 379/201 |
| 6,069,890 A | * | 5/2000 | White et al. ................. 370/352 |
| 6,075,992 A | | 6/2000 | Moon et al. ................. 455/455 |
| 6,084,584 A | | 7/2000 | Nahi et al. ................... 345/329 |
| 6,141,341 A | | 10/2000 | Jones et al. .................. 370/352 |
| 6,161,134 A | | 12/2000 | Wang et al. ................. 709/220 |
| 6,163,598 A | | 12/2000 | Moore ...................... 379/93.23 |
| 6,167,040 A | | 12/2000 | Haeggstrom ................ 370/352 |
| 6,175,860 B1 | | 1/2001 | Gaucher ...................... 709/208 |
| 6,188,688 B1 | | 2/2001 | Buskirk, Jr. ................. 370/389 |
| 6,192,044 B1 | * | 2/2001 | Mack ........................... 370/352 |
| 6,212,261 B1 | | 4/2001 | Meubus et al. .......... 379/88.12 |
| 6,216,158 B1 | | 4/2001 | Luo et al. .................... 709/217 |
| 6,226,373 B1 | * | 5/2001 | Zhu et al. .............. 379/207.02 |
| 6,240,097 B1 | | 5/2001 | Weslek et al. ............... 370/431 |
| 6,301,609 B1 | | 10/2001 | Aravamudan et al. ...... 709/207 |
| 6,308,201 B1 | | 10/2001 | Pivowar et al. ............. 709/214 |
| 6,334,126 B1 | | 12/2001 | Nagatomo et al. .............. 707/4 |
| 6,337,858 B1 | | 1/2002 | Petty et al. .................. 370/356 |
| 6,359,892 B1 | | 3/2002 | Szlam et al. ................. 370/401 |
| 6,385,308 B1 | | 5/2002 | Cohen et al. ............ 379/88.23 |
| 6,400,804 B1 | | 6/2002 | Bilder .......................... 379/76 |
| 6,404,764 B1 | | 6/2002 | Jones et al. .................. 370/352 |
| 6,411,965 B2 | | 6/2002 | Klug ........................... 707/201 |
| 6,414,962 B1 | | 7/2002 | Hall et al. .................... 370/401 |
| 6,418,198 B2 | | 7/2002 | Brablec et al. ................ 379/79 |
| 6,445,697 B1 | | 9/2002 | Fenton ........................ 370/357 |
| 6,446,127 B1 | | 9/2002 | Schuster et al. ............. 709/227 |
| 6,448,978 B1 | | 9/2002 | Salvador et al. ............. 345/741 |
| 6,456,594 B1 | | 9/2002 | Kaplan et al. ............... 370/238 |
| 6,456,601 B1 | | 9/2002 | Kozdon et al. .............. 370/259 |
| 6,477,565 B1 | | 11/2002 | Daswani et al. ............. 709/217 |
| 6,477,576 B2 | | 11/2002 | Angwin et al. .............. 709/226 |
| 6,483,902 B1 | | 11/2002 | Stewart et al. ........... 379/90.01 |
| 6,493,338 B1 | | 12/2002 | Preston et al. ............... 370/352 |
| 6,496,477 B1 | | 12/2002 | Perkins et al. ............... 370/228 |
| 6,526,462 B1 | | 2/2003 | Elabd .......................... 710/242 |
| 6,539,359 B1 | | 3/2003 | Ladd et al. .................. 704/275 |
| 6,570,869 B1 | * | 5/2003 | Shankar et al. .............. 370/352 |
| 6,577,622 B1 | | 6/2003 | Schuster et al. ............. 370/352 |
| 6,584,490 B1 | | 6/2003 | Schuster et al. ............. 709/200 |
| 6,587,458 B1 | * | 7/2003 | Burg et al. ................... 370/356 |
| 2001/0022784 A1 | | 9/2001 | Menon et al. ............... 370/352 |
| 2001/0030950 A1 | | 10/2001 | Chen et al. .................. 370/329 |

FOREIGN PATENT DOCUMENTS

| | | | | |
|---|---|---|---|---|
| EP | 0 858 202 A2 | 2/1998 | ........... | H04M/1/274 |
| EP | 0 869 688 A2 | 10/1998 | ........... | H04Q/3/00 |
| EP | 0 918 423 A2 | 10/1998 | ........... | H04L/29/06 |
| EP | 0 881 848 A2 | 12/1998 | ........... | H04Q/7/22 |
| WO | WO95/34985 | 12/1995 | ........... | H04M/3/42 |
| WO | WO 97/31492 | 8/1997 | ........... | H04Q/3/00 |
| WO | WO 97/33421 | 9/1997 | ........... | H04M/3/42 |
| WO | WO98/00988 | 1/1998 | ........... | H04Q/7/22 |
| WO | WO 98/04065 | 1/1998 | ........... | H04L/9/00 |
| WO | WO98/10538 | 3/1998 | ........... | H04B/7/26 |
| WO | WO 99/45687 | 3/1998 | ........... | H04M/1/27 |
| WO | WO 98/16051 | 4/1998 | ........... | H04M/3/00 |
| WO | WO98/21911 | 5/1998 | ........... | H04Q/7/38 |
| WO | WO 98/30008 | 7/1998 | ........... | H04M/7/00 |
| WO | WO 98/37665 | 8/1998 | ........... | H04L/12/28 |
| WO | WO 99/35802 | 1/1999 | ........... | H04L/29/06 |
| WO | WO 99/12365 | 3/1999 | ........... | H04Q/7/22 |
| WO | WO 99/19988 | 4/1999 | | |
| WO | WO 01/05078 A2 | 7/2000 | ........... | H04J/3/16 |

OTHER PUBLICATIONS

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

International Search Report for PCT Application Ser. No. PCT/US00/26618, Dated Feb. 19, 2001.

Pepper, David J. et al., *The Call Manager System: A Platform for Intelligent Telecommunications Services*, Speech Communication, vol. 23, (1997), pp. 129–139.

Dalgic, Ismail et al., *True Number Portability and Advanced Call Screening in a SIP–Based IP Telephony System*, IEEE Communications Magazine, vol. 37, No. 7, (Jul. 1999), pp. 96–101.

International Search Report for PCT Application Ser. No. PCT/US00/26094, Dated Jan. 31, 2001.

International Search Report for PCT Application Ser. No. PCT/US00/26594, Dated Feb. 6, 2001.

Watanabe, H. et al., *Development of the BTRON–BrainPad*, Proceedings 13th Tron Project International Symposium, Online!, (Dec. 4–7, 1996), pp. 95–103.

Gessler, Stefan et al., *PDAs as Mobile WWW Browser*, Computer Networks and ISDN Systems, vol. 28, No. 1, (Dec. 1995), pp. 53–59.

International Search Report for PCT Application Ser. No. PCT/US00/26650, Dated Feb. 19, 2001.

International Search Report for PCT Application Ser. No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pp. 151–157.

International Search Report for PCT Application Ser. No. PCT/US00/26649, Dated Feb. 6, 2001.

Hansson, Allan et al., *Phone Doubler —A Step Towards Integrated Internet and Telephone Communities*, Ericsson Review, No. 4, 1997, pp. 142–152.

Zellweger, Polle T. et al. *An Overview of the Etherphone System and Its Applications,* Xerox Palo Alto Research Center (Mar. 1988), pp. 160–168, XP 000617541.

Terry, Douglas B. et al. *Managing Stored Voice In the Etherphone System,* Xerox Palo Alto Research Center vol. 1, (Feb. 1998), pp. 3–27, XP 000032477.

Terry, Douglas B. et al. *Managing Stored Voice In the Etherphone System*, Operating Systems Review (SIGOPS), US ACM Head Quarter, New York, NY. vol. 21, No. % (Nov. 8, 1987), pp. 103–104, XP 000005196.

U.S. patent application Ser. No. 09/406,320, Schuster et al., filed Sep. 27, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/406,152, Schuster et al., filed Sep. 27, 1999.

U.S. patent application Ser. No. 09/405,981, Schuster et al., filed Sep. 27, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.S. patent application Ser. No. 09/516,269, Schuster et al., filed Feb. 29, 2000.

U.S. patent application Ser. No. 09/515,366, Schuster et al., filed Feb. 29, 2000.

U.S. patent application Ser. No. 09/707,708, Schuster et al., filed Nov. 11, 2000.

U.S. patent application Ser. No. 09/677,077, Schuster et al., filed Sep. 29, 2000.

U.S. patent application Ser. No. 09/584,927, Schuster et al., filed May 31, 2000.

U.S. patent application Ser. No. 09/726,993, Schuster et al., filed Nov. 30, 2000.

U.S. patent application Ser. No. 09/728,833, Schuster et al., filed Nov. 30, 2000.

"Understanding Packet Voice Protocols"; The International Engineering Consortium; http://www.iec.org.

* cited by examiner

New Account

Welcome to 3Com/(Yahoo!, AOL, MSN, AT&T, MCI Level 3) Internet Voice Services 3Com/XXX Internet voice services members can be reached at 1-800-555-3Com Ext. (provider number)(personal number)

Enter the following information to create a telephone user account and to receive an Internet Voice Services extension.

A password
Re-enter:
A short name for caller ID:
Your e-mail address:
The phone device ID:
A credit card and expiration date:

Select desired features:

- Call blocking
- Call return
- Call race
- Caller ID
- Caller ID blocking
- Priority ringing
- Call forwarding

- Call transfer
- Call forwarding
- Camp-on queuing
- Conference calling
- Call parking
- Executive override

ORDER!

*Fig. 4*

Congratulations!

Your account has been activated.

+ The access telephone number for your new service is: 1-800-5553Com
+ Your extension is: 200 634-0610

Some Frequently asked questions:
Q: How do I dial another 3Com / XXX Internet phone user?
A: You first dial the local access number. Local access numbers may be retrieved by dialing (800)555-GET#. Then dial the user's extension.

Q: How do I dial traditional people phones?
A: Simply dial the person's telephone number.

Q: How are calls billed?
A: There is no extra charge for calls toother 3Com/XXX subscribers.
There is no extra charge to make domestic long distance calls over the Public Telephone Net. International calls over the public network are billed to your credit card on a per-call basis.

Q: How do I set speed dials and other advanced features?
A: Goto www.3comvoice.com/Username.3com.com@xyz.com an enter your password ZZZ.

*Fig. 5*

SYSTEM AND METHOD FOR PROVIDING TELEPHONE SERVICE HAVING PRIVATE BRANCH EXCHANGE FEATURES IN A VOICE-OVER-DATA NETWORK TELEPHONY SYSTEM

BACKGROUND OF THE INVENTION

A. Field of the Invention

The present invention is related to field of telecommunications, and more particularly to a system and method for providing communication services over a network.

B. Description of the Related Art and Advantages of the Present Invention

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the well known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or deactivate a CLASS feature using "*" directives (e.g., *69 to automatically return a call to the most recent caller). CLASS features may also be implemented with the use of out-of-band data. CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call.

After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call.

One advantage of data network telephony is that it provides data services providers (e.g. Internet Service Providers, or ISP's) with the ability to become telephone service providers. For example, an established ISP may have a large number of points-of-presence (POPs) in a geographical region (or globally). The ISP may take advantage of these POPs to offer telephone service by making each POP a local host for nearby subscribers. The POPs are accessible using an access telephone number. A user dials the access telephone number on a PSTN telephone to connect to a POP via the nearest gateway. In response to a prompt, the user may be required to dial an account number, or other validation of subscription identifier before entering the PSTN telephone number of a callee with whom the user wants to talk by telephone. The POP may then search for the nearest gateway to the callee to complete the connection using a voice-over-data channel.

The telephone service offered by Internet telephony providers including ISPs advantageously delivers low-cost long distance connectivity. Such service offerings from ISPs, however, still lack features, such as CLASS and PBX features. One additional problem is that the assignment of telephone numbers is still controlled by PSTN service providers.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that provides a way for users of PSTN telephones to use PBX features without having to be connected to a special private branch exchange system. Users may subscribe to an Internet telephony system and receive an "extension" instead of a traditional E.164 telephone number. The user, or subscriber would be accessible by calling an access number to reach the POP and using the extension to reach the subscriber. Calls, attempted calls, and PBX services may be implemented by reference to the extension. In accordance with embodiments of the present invention, ISPs may also implement on-line forms to subscribe or modify subscriptions. On-line billing may also be implemented.

One advantage of the present invention is that telephone features become user-configurable.

Another advantage is that the extent to which features are user-configurable may be determined by the service provider. The service provider may wish to make a few basic features standard and impose their use in a registration function. Other features may then be made selectable by the user.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 4 is a depiction of a sample screen for ordering telephone service for the data network telephone of FIG. 1;

FIG. 5 is a depiction of a sample screen for confirming telephone service for the data network telephone of FIG. 1.

DETAILED DESCRIPTION OF THE PREFERRED EMBODIMENT

The following references to patent applications, patents and technical documents, which include protocols and standards, are incorporated be reference:

U.S. Pat. No. 5,525,595 to Dale Walsh

U.S. Pat. No. 5,577,105 to Baum et al.

"System and Method for Controlling Telephone Service Using a Wireless Personal Information Device" to Schuster, et al.

ITU-T Recommendation G.711 (1988) "Pulse Code Modulation (PCM) of Voice Frequencies."

ITU-T Recommendation G.723.1 "Dual Rate Speech Coder for Multimedia Communications Transmitting at 5.3 and 6.3 Kbit/s"

ITU-T Recommendation H.323 "Visual Telephone Systems and Equipment for Local Area Networks Which Provide a Non-Guaranteed Quality of Service"

ITU-T Recommendation H.225.0 (1996), *"Media Stream Packetization and Synchronization on Non-Guaranteed Quality of Service LANs."*

RFC 1889: RTP: A Transport Protocol for Real-Time Applications, Jan. 25, 1996

RFC 1890: RTP Profile for Audio and Video Conferences with Minimal Control, Jan. 25, 1996

ITU-T Recommendation Q.931 Digital Subscriber Signaling System No. 1 (DSS 1)-ISDN User-Network Interface Layer 3 Specification for Basic Call Control ITU-T Recommendation H.245 Control Protocol for Multimedia Communication Handley, M., Schooler, E., and H. Shulzrinne, "Session Initiation Protocol ("SIP")", Internet-Draft (draft-ieft-mmusic-sip-06.txt) Work in Progress ITU-T Draft Recommendations H.332 (1998), *Loosely Coupled* H.323 *Conferencing*

Figure 1:
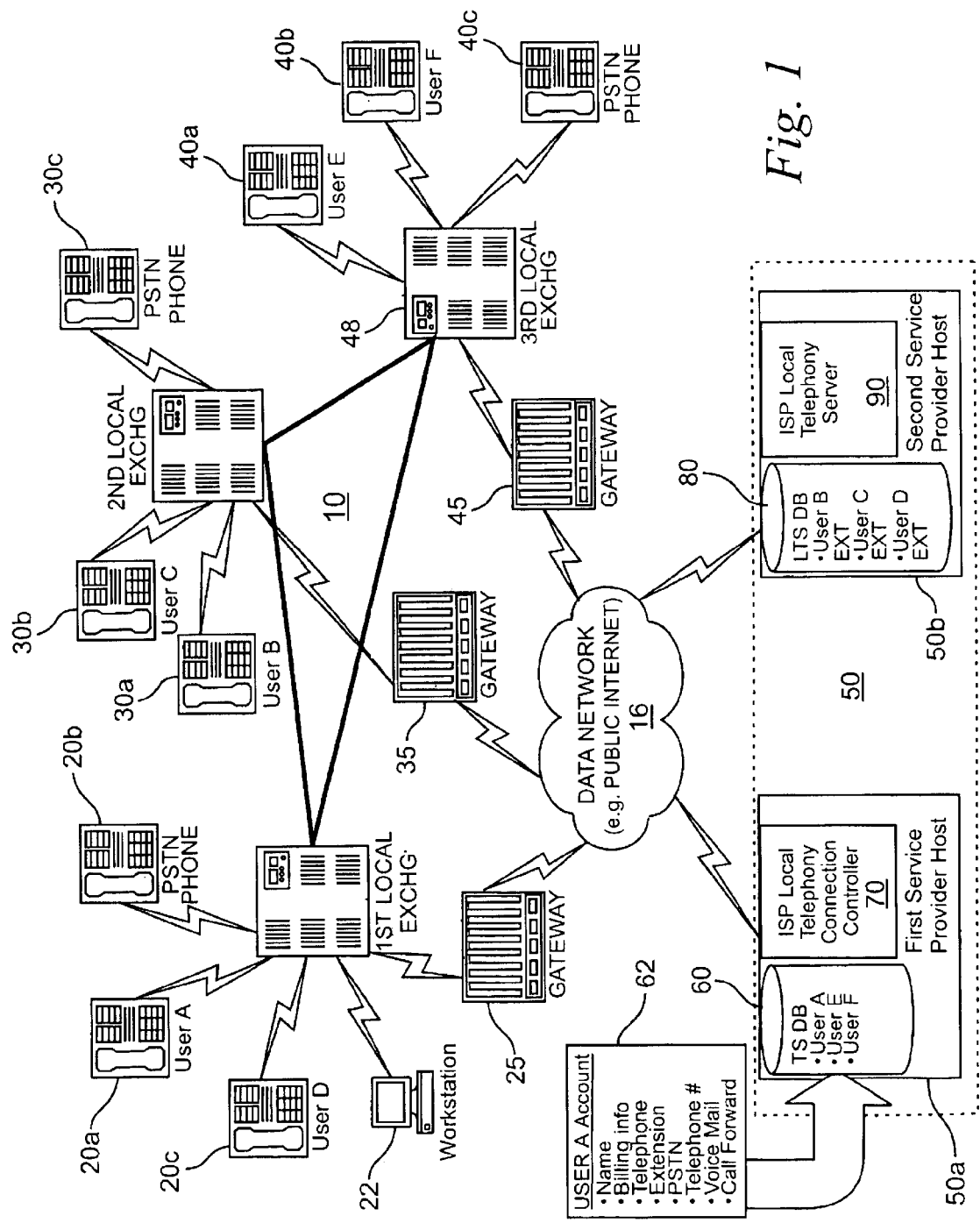
FIG. 1 is block diagram of a data network telephony system for providing telephony and enhanced telephony services in accordance with embodiments of the present invention.

FIG. 1 is a block diagram showing an example of a system 10 for providing telephony services according to preferred embodiments of the present invention. The system includes a public-switched telephone network (PSTN) system of trunk lines 12, a data network 16, telecommunications devices 20a–c, 30a–c, 40a–c, local exchanges 28, 38, 48, gateways 25, 35, 45 and service provider hosts 50a,b.

The data network 16 provides data connectivity using data communications channels. The data communications channels communicate data in accordance with data transport protocols to permit wide usage of the data network 16 and to provide data connectivity for users of equipment from many sources. One example of the data network 106 that may be used in a preferred embodiment is the public Internet. One type of data communications channels that may be communicated on the data network 16 is a voice-over-data channel in which voice signals are formatted and communicated as data packets.

The PSTN trunk lines 12 and the local exchanges 28, 38, 48 are part of the PSTN, which is presently used to provide the majority of the telephone service. Users of telephone services communicate by voice telephone connections using the telecommunications devices 20a–c, 30 a–c and 40a–c devices 20a–c, 30a–c and 40a–c are connected to corresponding local exchanges 28, 38 and 48, which are connected to each other by the trunk lines 12. A telephone connection between a caller at the first telephone connection 20a for example and a user at telecommunications device 40a includes a connection to the first local exchange 28, a connection to the local exchange 48 corresponding to the telecommunications device 40a over the trunk lines 12 and a connection between the local exchange 48 and the second telecommunication device 40a. The local exchanges 28, 38, 48 use a telephone number assigned to the telecommunications devices to determine how the telephone connection is to be routed. The telephone number corresponds to a connection path, or a circuit that connects the telecommunications device to the local exchange to allow users to make telephone connections to one another.

In the system 10 in FIG. 1, telephone connections may also be made using the data network 16 in accordance with embodiments of the present invention. The data network 16 is used to connect a caller and a callee between access points, such as gateways 25, 35, 45 that connect the PSTN to the data network 16. Telephone service is provided by the data network service provider 50 using at least one service provider host 50a,b. The service provider hosts 50a,b include a telephone service database 60 and a local telephony connection controller 70.

The telephone service database 60 may include account information for each user served by the host. FIG. 1 shows an example of a user account 62 that may be stored in the telephone service database 60. The user account 62 includes the telephone extension corresponding to the user and a PSTN telephone number corresponding to the telecommunications device 20a. For example, a user, User A, may subscribe to such a telephone service by connecting to the service provider host 50a on a data connection using a personal computer 22. The data service provider 50 may provide an access site having a data entry form to enable a user to enter information relating to telephony features to which the user may wish to subscribe, and billing information. User A may receive a telephone extension from the data network service provider 50, which may be used by other users to establish a connection with the telecommunications device 20a.

To establish a telephone connection, the service provider host 50a is accessed using the local access identifier, which is an identifier, preferably in the format of an E.164 telephone number. When another user, a caller, attempts to establish a connection with User A, the caller dials a local service access identifier to connect to the service provider host 50a near User A. The caller then enters User A's telephone extension in accordance with prompts, or other directions from the service provider host 50a.

In addition, User A's telecommunications device 20a may be provisioned by the PSTN telephony service provider to connect to the first gateway 25 whenever the telecommunications device 20a attempts to initiate a telephone connection (e.g. lifts the handset). The local exchange 28 may also connect the telecommunications device 20a to the gateway 25 when User A dials a selected telephone number at the telecommunications device 20a. The gateway 25 communicates voice signals received from the first telecommunications device as voice-over-data packets on the data network, and voice-over-data packets received from the data network as voice signals to the telecommunications device 20a.

One advantage of embodiments of the present invention is that the data network service provider may provide the telephony service using a well-established infrastructure. The local exchanges 28, 38, 48 may include the same local exchanges and central offices being used in present PSTNs. Local exchanges 28, 38, 48 are well-known and require no further description. The gateways 25, 35, 45 connected to the local exchanges 28, 38, 48 may include any suitable gateway, router, server or other equipment that is typically used to provide access to data services.

Suitable gateways may include a plurality of T1/E1/ISDN interfaces that connect the gateway to the local exchanges 28, 38, 48. The T1/E1/ISDN interfaces input T1/E1/ISDN signals and convert the T1/E1/ISDN signals to digital packets for communication on a Time-Domain Muliplexed (TDM) bus to a network interface. The T1/E1/ISDN interfaces may also receive digital packets from the network interface for conversion to T1/E1/ISDN signals for communication to the local exchanges 28, 38, 48. The network interface contains software and hardware modules to perform call routing, and other features associated with voice-over-data communications. For example, the network interface may communicate call routing information with the service provider hosts 50a,b; establish and control voice-over-data channels between gateways; route the data communicated on the channels to and from the serial lines connected to the callers and callees; and establish and control data channels to communicate call control information between the callers, callees and the host. The network interface may include an EdgeServer™ card that consists of a general purpose computing platform (such as an IBM PC) running a stand alone or shareware network operating system such as Windows NT™ from Microsoft Corporation or UNIX.

The patents to Dale M. Walsh et al., U.S. Pat. No. 5,525,595; Baum et al., U.S. Pat. No. 5,577,105; Verthein et al., patent application Ser. No. 08/813,173; and Naudus, patent application Ser. No. 09/122,201; which are fully incorporated by reference herein, describe gateways suitable for connecting the public switched telephone network to a data network such as the Internet. Such a device has been commercialized widely by 3Com Corporation (previously U.S. Robotics Corp.) under the trade designation Total Control™ Enterprise Network Hub. Gateways similar in functionality, architecture and design are available from other companies, including Ascend Communications, Lucent Technologies, Multitech, and others.

In addition, the data network service provider would be the source for obtaining telephone extensions. Telephone extensions would also be assigned to the subscribers instead of to the telecommunications device, which would provide the user with true number portability. A user may use the same telephone number for a long time regardless of where the user lives or what telecommunications device is used.

Embodiments of the present invention also advantageously make functions previously available on PBX's to users that are connected to the PSTN. Such functions include Call Transfer, Call Forwarding, Camp-On Queueing, Conference Calling, Call Parking, Executive Override, etc.

Figure 2:
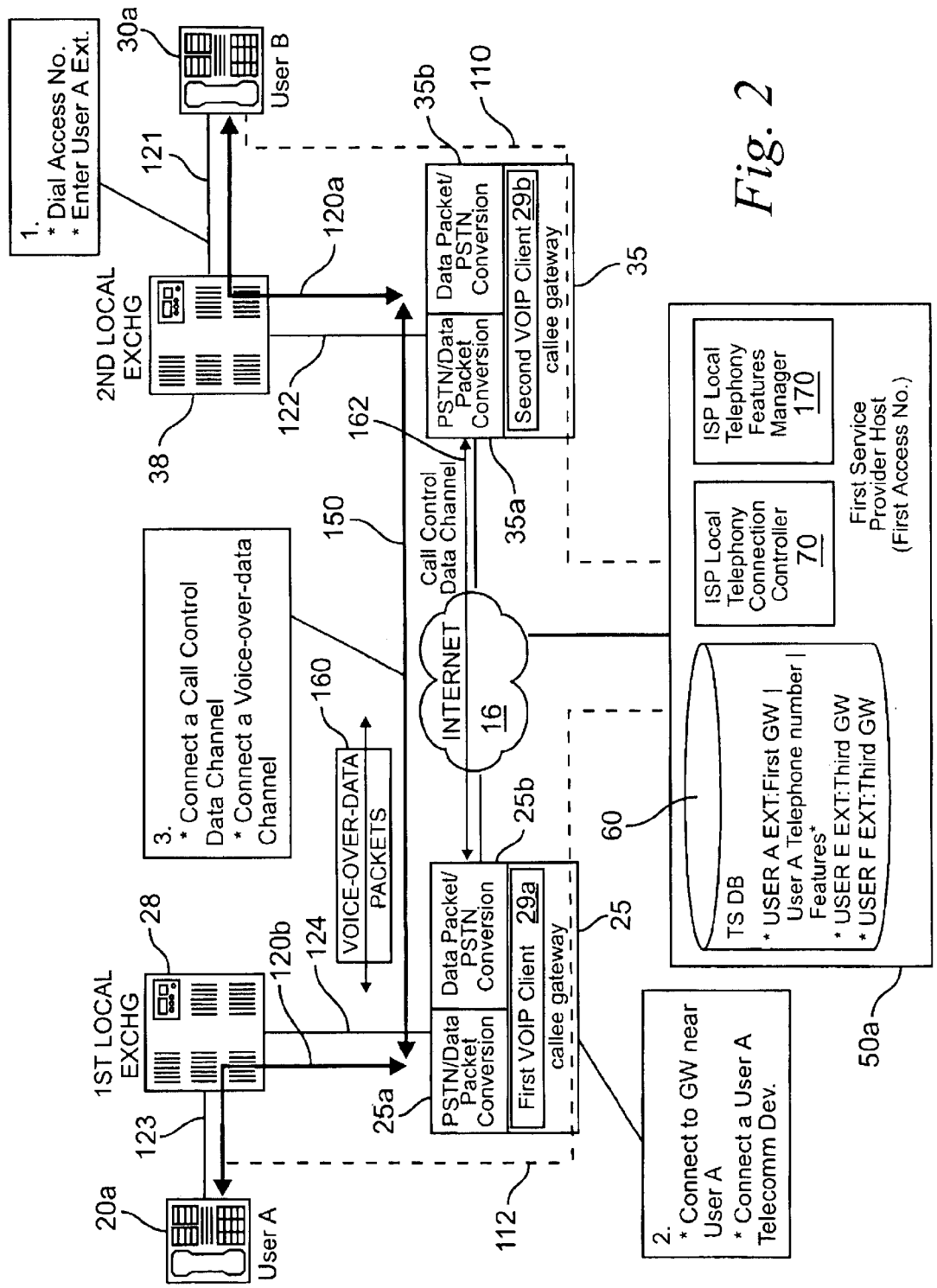
FIG. 2 shows one embodiment of the system of FIG. 1 showing one example of a call to a subscriber of the telephony services provided by the system of FIG. 1.

FIG. 2 shows an example of the connections made and the information transferred during the initiation of a telephone connection using a voice-over-data channel in accordance with embodiments of the present invention. In the example shown in FIG. 2, User B establishes a telephone connection with User A. User B may or may not be a subscriber of telephone services provided by the data service provider 50. User A is a subscriber of the telephone services provided by the data service provider 50 using the service provider host 50a as a host and account manager. The service provider 50 in accordance with one preferred embodiment of the present invention is an Internet service provider (ISP).

In the example shown in FIG. 2, User B's telecommunications device 30a is the caller telecommunications device 30a. The second gateway 35 is the caller gateway. The first gateway is the callee gateway and User A's telecommunications device 20a is the callee telecommunications device. The callee and caller gateways 25, 35 include a first and second VOIP client 29a,b which manages the telephone connection at the gateway level.

The caller gateway 35 includes a telephony signal to data packet converter 35a to convert voice signals to data packets. The telephony signal to data packet converter 35a may be connected to a T1 connection and receive voice signals formatted as G.711 symbols. The symbols are processed as a data payload on RTP packets and communicated at a network interface on the gateway 35 over a UDP/IP channel.

The caller gateway 35 also includes a data packet to telephony signal converter 35b to convert data packets to voice signals. The data packet to telephony signal converter 35b receives RTP data packets from the UDP/IP channel on the Internet and retrieves the G.711 symbols from the payload of the RTP packets. The G.711 symbols are then communicated on the T1 connection.

Referring to Step 1 in FIG. 2, User B initiates the telephone connection by first dialing an access telephone number to connect to the second VOIP client 29b in the caller gateway 35. The second VOIP client 29b may establish a first control connection 110 between the User B's telecommunications device 30a and the ISP host 50a. The first control connection 110 may communicate, for example, on a caller PSTN connection 120a and a data channel formed between the caller gateway 35 and the service-provider host 50a. The caller PSTN connection 120a includes a local subscriber loop connection 121 between the telecommunications device 30a and the second local exchange 38, and a T1 connection 122 between the second local exchange 38 and the caller gateway 35. The data channel between the caller gateway 35 and the service provider host 50a may include a TCP/IP or a UDP/IP connection that communicates data packets having call initiation information. The call initiation information may include user account information and User A's telephone extension and may be communicated as data packets based on H.245 Multimedia Connection protocol (incorporated herein by reference), or any other suitable protocol. For example, the Session Initiation Protocol (SIP), MEGACO, and the MGCP protocols may also be used.

The data channel between the caller gateway 35 and the ISP host 50a is used by the second VOIP client 29b in the caller gateway 35 to receive a callee gateway identifier which the ISP host 50a may retrieve from the user's account information, or by decoding the telephone extension if the telephone extensions are formatted to provide location information. For example, the callee gateway 25 may be defined to be the gateway that is closest to the callee and all callees served by that callee gateway 25 may be given a telephone extension having a gateway identifier sequence that is similar to an area code in the E.164 format. In an alternative embodiment, the second VOIP client 29b determines the callee gateway identifier without communicating with the ISP host.

The second VOIP client 29b uses the gateway identifier to identify the other gateway to be used in the telephone connection.

The ISP host 50a includes a local telephony connection controller 70 that includes functions to receive telephone extensions during call initiation, functions to verify user account and billing information, and functions to establish a voice-over-data communications channel 150 between the caller gateway 35 and the callee gateway 25.

The telephony connection controller 70 may also establish a call control data channel 162 between the gateways 35,25. The call control data channel 162 communicates information relating to the status of the telephone connection. Such information may include a "ring" or data indicating the initiation of a call, a "hang-up" or data indicating the termination of a call, status messages, tones or audio signals intended to indicate the status of the call. Control functions may be performed in the caller and callee gateways 25, 35 by the first and second VOIP clients 29a,b.

DTMF tones that have particular meanings to the context of the call may be coded digitally and communicated as a data packet. For example, the DTMF tones used to operate a voice mail system may be coded and communicated as data. Information communicated on the call control channel 162 may conform to the H.245 protocol. The telephony connection controller 170 may implement or communicate with a Gatekeeper, an LDAP directory server and a domain name server to perform account and connection functions. Information between the User B telecommunications device 30a and the ISP host 50a is communicated on the first control connection 110.

Referring to Step 2 in FIG. 2, the telephony connection controller 70 establishes the voice-over-data channel 150 and the call control data channel by retrieving the gateway identifier (e.g. IP address, URL, etc.) for the callee gateway 25 from User A's account in the telephony service database 60 and sending the identifier to the second VOIP client 29b in the caller gateway 35. The second VOIP client 29b in the caller gateway 35 may then use the identifier to establish the voice-over-data channel 150 and the call control data channel 162.

The callee gateway 25 includes a telephony signal to data packet converter 25a to convert voice signals to data packets. The telephony signal to data packet converter 25a may be connected to a T1 connection and receive voice signals formatted as G.711 symbols. The symbols are processed as a data payload on RTP packets and communicated at a network interface on the gateway 25 over a UDP/IP channel.

The callee gateway 25 also includes a data packet to telephony signal converter 25b to convert data packets to voice signals. The data packet to telephony signal converter 25b receives RTP data packets from the UDP/IP channel on the Internet and retrieves the G.711 symbols from the payload of the RTP packets. The G.711 symbols are then communicated on the T1 connection.

The voice-over-data channel 150 is preferably a UDP/IP channel communicating audio signals formatted as RTP packets. The call control data channel 162 is preferably a TCP/IP channel communicating control information. The control information communicated over the call control channel 162 may be formatted as RTCP packets, although any suitable data format may be used.

In sending the identifier and telephone extension to the second gateway 35 to establish the voice-over-data channel 150 and the call control data channel 162, the telephony connection controller 70 may also include a User A telephone number from the telephony service database 60. The second gateway 60 may use the User A telephone number, a PSTN-assigned telephone number, to establish a callee PSTN connection 120b with the User A telecommunications device 20a. The callee PSTN connection 120b includes a callee local subscriber loop connection 123 between the telecommunications device 20a and the first local exchange 28, and a T1 connection 124 between the first local exchange 28 and the first gateway 25.

In addition to the voice-over-data channel 150 and the call control data channel 162, the telephony connection controller 70 creates a second control connection 112 between the ISP host 50a and the User A telecommunications device 20a.

In one embodiment of the present invention, the first and second control connections 110, 112 are maintained open throughout the duration of the telephone connection to permit the operation of any PBX or CLASS features (described below with reference to FIG. 3).

At Step 3 in FIG. 2, the conversation between User B and User A takes place over the voice-over-data channel 150. The conversation comprises voice-over-data packets 160, which include an audio signal preferably as G.711 PCM-coded voice signals. Dual-Tone Multi-Frequency (DTMF) signals, also G.711 PCM-coded, may be included in the audio signal as the users presses dialing keys, or otherwise generates DTMF tones at the telecommunications devices 20a, 30a. The T1/E1/ISDN interfaces in the gateways receive the audio signal from the telecommunications devices 20a, 30a. In one embodiment, the G.711 audio signal is transcoded to a G.723.1/G.729 compressed audio signal. The audio signals are formatted as packets of data according to the Real-time Transport Protocol (RTP) standard. The RTP packets are then transported according to the UDP/IP network and transport protocols.

The DTMF signals, and other control signals, may be formatted as data packets for transport over the Internet 16 using a variety of methods. In one embodiment, each DTMF signal is translated to a DTMF digit that may match the dialing keypad number pressed to generate the signal. The DTMF digit is communicated as an H.245 control, using for example, the UserInputIndication message. Using the TCP-based H.245 standard to transport the call control data packets ensures reliable delivery of the data packets. Alternatively, the control data packets may be transported as UDP-based RTP packets.

Figure 3:
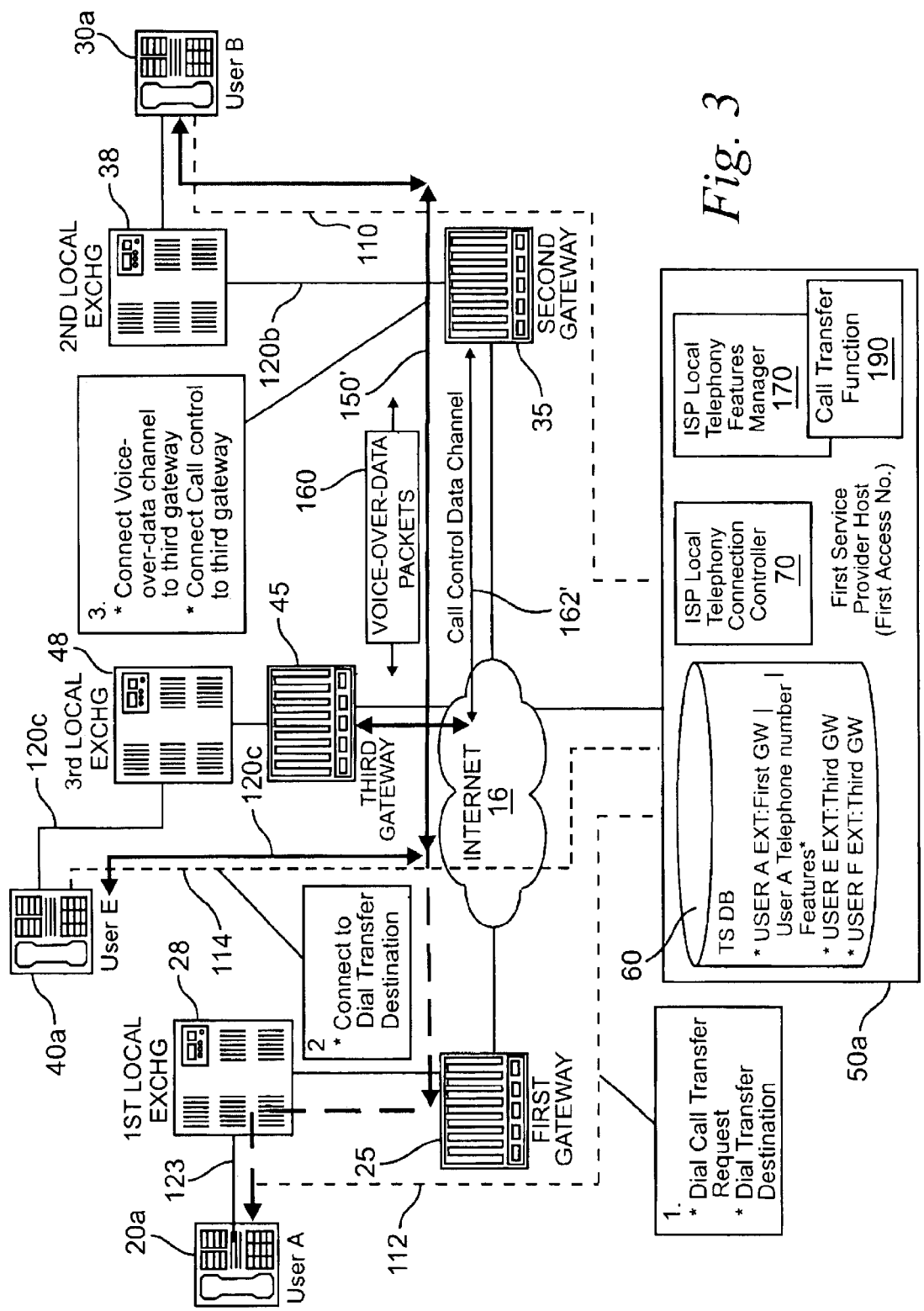
FIG. 3 shows one example of performing a PBX feature using the system of FIG. 1.

FIG. 3 shows an example of the connections made and the information transferred when one of the parties uses one of the PBX features that may be performed in one embodiment of the present invention. In the example shown in FIG. 3, User A transfers a call to User E, another subscriber to the telephony service provided by the ISP 50. User E's telecommunications device 40a is connected to the third local exchange 48, which accesses the Internet 16 via the third gateway 45.

The ISP host 50a may include, or communicate with, a features manager 170 to perform the PBX and CLASS features for subscribers to the ISP's telephone service. The features manager 170 in FIG. 3 includes program functions that perform the PBX and CLASS features available. One such feature is the call transfer feature implemented by a call transfer function 190. The features may be accessed by dialing a call transfer code sequence, which may comprise a series of symbols from the keypad that are predefined to invoke specific functions. For example, a "*" and a two digit sequence, such as "5", "6" may invoke the call transfer function 190.

At Step 1 in FIG. 3, User A may initiate the call transfer by dialing the call transfer code sequence at the User A telecommunications device 20a. The call transfer code sequence is communicated to the call transfer function 190 on the second control connection 112. The user may include the telephone extension of the transferee telecommunications device 40a by dialing the telephone extension after the call transfer code sequence. Alternatively, the call transfer function 190 may prompt User A by sending a tone, or an audio prompt (using a UDP/RTP data connection) to the User A telecommunications device 20a. User A may respond by dialing the telephone extension of User E. The telephone extension of User E is communicated over the second control connection 112 to the call transfer function 190.

At Step 2 in FIG. 3, the ISP host 50a transfers the telephone call to the User E telecommunications device 40a. The call transfer function 190 may initiate a third control connection 114 via the third gateway 45 and the third local exchange 48 using a transferee PSTN connection 120c and a third data channel formed between the third gateway 45 and the ISP host 50. The third control connection 114 includes a local subscriber loop 125 between the third telecommunications device 40a and the third local exchange 48, and a T1 channel 126 between the third local exchange 48 and the third gateway 45. The call transfer function 190 may initiate the transferee PSTN connection 120c by retrieving the third gateway identifier and the User E telephone number from the User E records in the telephony service database 160. The gateway identifier is used to initiate a data channel with the third gateway 45. The telephone number is used to connect the third gateway 45 to the telecommunications device 40a.

At Step 3, the ISP host 50a may communicate messages to the second gateway 35 to initiate a transferred voice-over-data channel 150' and a transferred call control data channel 162' between the second gateway 35 and the third gateway 45. Once the transferred voice-over-data channel 150' is operational, the call transfer function 190 operation is complete and voice communications may be carried out between User B and User E on the transferred voice-over-data channel 150'. The first voice-over-data channel 150 may remain open as long as User A keeps the connection open, or it may be shutdown once the second voice-over-data channel 150' has been established.

Other PBX functions may be implemented using functions in the features manager 170. For example, a call forwarding function may be implemented such that the telephone number in the user records that is used to connect to the telecommunications device is modified to forward calls to a different telecommunications device. In addition, a call forwarding telephone number may be designated in the user's records in the telephony service database 60 to which a call is transferred when there is no answer or a busy signal at the original telephone number. A function similar to the call transfer function 190 described with reference to FIG. 3 may be implemented for a conference calling feature.

Embodiments of the present invention advantageously permit for a simplified and user-friendly system and method for request telephone service. For example, because service is provided by an ISP, the requests may be carried out on-line.

A new subscriber wishing to order telephone service from the ISP 50 (shown in FIG. 1) may perform a service initiation to ensure that all necessary account information is stored in the user's account records in the telephony service database 60. Table A shows information that may be requested from the user for inclusion in the user's account records.

TABLE A

● Telephone Extension: a sequence of alphanumeric elements that uniquely identifies the user. The user identifier may be formatted as an E.164 telephone number, or as a name. E.164 numbers are preferred to ensure operation with POTS telephones. The telephone extension numbers may be unique throughout the universe of users on the telephony system (shown in FIG. 1), or it may acquire such uniqueness by association with a telephony server host.
● Telephone Number: a sequence of alphanumeric elements that uniquely identifies the telephone. The telephone identifier may be formatted as an E.164 telephone number, or as any other type of number. The telephone identifier may be unique throughout the universe of telephones, or it may acquire such uniqueness by association with a server identifier.
● The user's name, address and other information that may be used primarily for billing purposes. For example, the user's checking account number, credit card number or other financial information may be provided for automatic billing and payment capabilities.
● User's telephony service features. The user may subscribe, permanently or temporarily, to one or more telephony service features offered by the service provider:
　◆ Voice mail
　◆ Caller ID
　◆ Call Forwarding with true number portability
　◆ Teleconferencing
　◆ Call Transfer
　◆ Camp-on queuing
　◆ Call Parking
　◆ Executive Override
● Menu of functions
● Help menu
● Speed dial key programming (e.g. speed dial to customer service)
● Features as standard offerings — to compete, a provider may offer features that normally cost extra (e.g. caller ID, etc.) as standard features
● Packaged configurations — Features and offerings may be grouped as distinctly priced packages In order to provide the ISP with the information to initiate a user account, the user may connect to a web-site belonging to the ISP. The user may use the personal computer 22 in FIG. 1 to connect on a TCP/IP connection to the ISP's web-site. The user may be instructed to bring up an web order page screen 217 as shown in FIG. 4. The user may fill in the information shown on the screen and press "Order", or otherwise initiate the process of ordering the service using the information on the screen. One of ordinary skill in the art will appreciate that the web page order screen 317 is illustrated as an example of the type of information requested during a service request session. More or less information may be requested.

When the user has entered the data requested in the order screen, the ISP host 50*a* may send a confirmatory message 417 on the workstation indicating what happens next. FIG. 5 shows an example of such a confirmatory message.

The system of FIG. 1 advantageously permits a data network service provider, or an Internet service provider where the Internet is the data network 16, the ability to become a telephone service provider. An ISP with many Points-of-Presence (POPs) can service a high number of users with coverage over a large geographical area without having to invest heavily in new equipment. The POPs may include the service hosts, such as the service provider host 50*a,b* shown in FIG. 1. The hosts 50*a,b* may operate as servers connected to the Internet via local access networks (LANs). The hosts 50*a,b* may also be servers operating in or near the network interface on the gateways 25 et seq. In a preferred embodiment, the telephone service hosts 50*a,b* operate with servers (e.g. HTTP servers) that provide web services.

A further advantage of embodiments of the present invention is that the telephone extensions, which are the telephone identifiers with which the users are accessed, are generated, distributed and maintained by the ISP.

Figure 6:
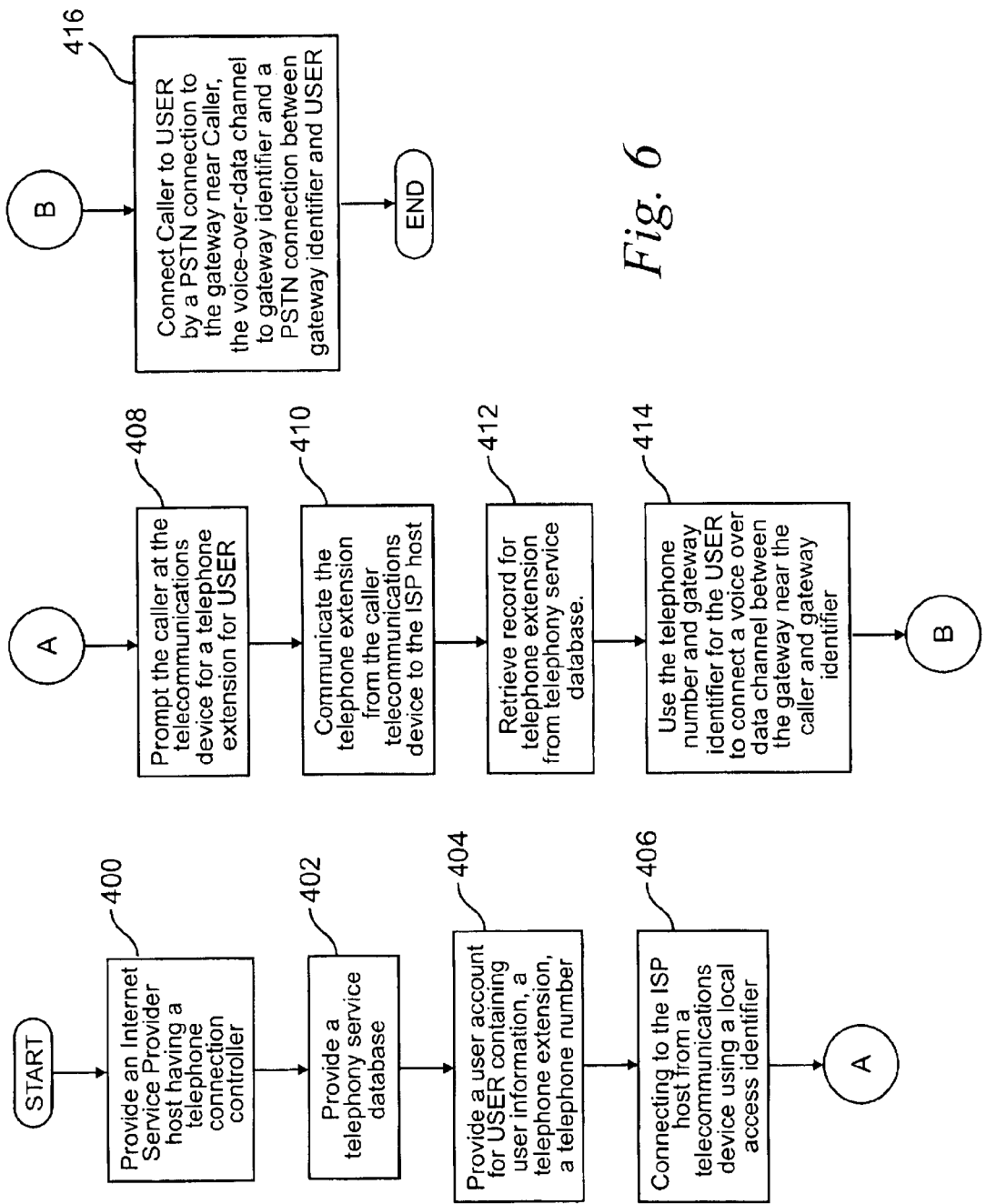
FIG. 6 is a flowchart showing an example of a method for providing telephone service having PBX features in accordance with preferred methods of the present invention.

FIG. 6 shows a flowchart of a method for providing telephony service having PBX features by a data network service provider. The method includes step 400, which is a step of providing an ISP host having a telephone connection controller such as the telephone connection controller 70 described above with reference to FIG. 1. At step 402, a telephony service database is provided to store user account information for the users that will use the service provider host for local access to telephone service. The database may include any type of storage system that may be accessed by the telephone connection controller 70. The telephone service database may include connection information, such as the telephone extension and the telephone number corresponding to the user's telecommunications device (e.g. 20*a*). The telephone service database may also include billing information and a provision profile for the user indicating features, such as PBX features, to which the user may subscribe. One feature to which the user may subscribe includes the Voicemail feature.

At step 404, the user may order telephone service from the ISP. Step 404 may be performed by the user connecting to a web-site provided by the ISP for creating new user accounts. The web-site and the forms it uses may be as elaborate as desired, allowing a user to choose very basic service, or to make selections of all desired features in one session. Once the user has completed the service request forms, the user is assigned a telephone extension and, pending any billing issues, the user becomes accessible for telephone connections over a data network.

At step 406, a caller starts the process of reaching the User by a telephone connection. The caller begins by dialing the local access identifier to reach the service provider host. At step 408, the service provider host may prompt the caller for the telephone extension that identifies the telecommunications device to which the caller would like to connect. At step 410, the caller dials the telephone extension corresponding to the user. At step 412, the telephone extension is used to retrieve account records for the user from the telephony service database. The account records may include a telephone number, or other telephone identifier that enables the local exchange to connect to the telecommunications device corresponding to the telephone extension. The account records may also include a gateway identifier that identifies a gateway used by the user's telecommunications device for voice over data packets. The gateway identifier preferably identifies a gateway nearest the user's telecommunications device.

At step 414, the telephony connection controller uses the telephone number and the gateway identifier retrieved from the user's account records to establish a voice over data channel between the caller gateway and the gateway near the user's telecommunications device. The telephony connection controller may communicate the telephone number corresponding to the user's telephone extension to the caller's gateway, which then uses the telephone number to connect to the telecommunications device via the user's local exchange. The telephony connection controller may alternatively connect directly with the user's gateway using a TCP/IP data channel to establish the PSTN connection and to refer the PSTN connection to the voice-over-data channel.

At step 416, the PSTN connection between the caller's telecommunications device and the caller's gateway is connected to the voice-over-data channel, which is connected to the PSTN connection between the user's gateway and the user's telecommunications device to complete the telephone connection. The conversation between the caller and the user of the ISP's telephony service may take place.

The ISP telephony service may also implement PBX functions by permitting PBX function codes to be communicated between the telecommunications devices and the function manager in the ISP service host. One example of how a Call Transfer function may operate is described above with reference to FIG. 3.

While the invention has been described in conjunction with presently preferred embodiments of the invention, persons of skill in the art will appreciate that variations may be made without departure from the scope and spirit of the invention.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for providing a telephone connection between a caller telecommunications device and a callee telecommunications device using a packet-switched data network, the system comprising:

a local service host having a user record to match an extension identifier to the callee telecommunications device, and a local access identifier to connect to the local service host from the caller telecommunications device;

a caller gateway having a network interface operable to connect to the packet-switched data network and a first public-switched telephone network (PSTN) interface operable to connect to the caller telecommunications device;

a callee gateway having a second network interface operable to connect to the packet-switched data network and a second PSTN interface operable to connect to the callee telecommunications device;

the caller gateway operable to open a first PSTN connection to the caller telecommunications device and a data channel to the local access host when the caller telecommunications device communicates the local access identifier;

the caller and callee gateways comprising a telephony signal to data packet converter to communicate voice signals from the caller and callee telecommunications devices as voice-over-data packets on the data network, and a data packet to telephony signal converter to communicate voice-over-data packets on the data network as voice signals to the caller and callee telecommunications devices; and a telephone connection controller operable to receive the extension identifier on the data channel connection to the caller gateway, to open a second PSTN connection between the callee gateway and the callee telecommunications device, and to open a voice-over-data channel between the caller gateway and the callee gateway, wherein the telephone connection between the caller and callee telecommunications devices includes the first and second PSTN connections and the voice-over-data channel.

2. A local telephony server connected to a data network comprising:

a local access identifier comprising a sequence of alphanumeric characters to open a connection with a calling telecommunications device, the connection comprising a first PSTN connection between the calling telecommunications device and a data channel to the local telephony server, the connection used by the calling telecommunications device to communicate a callee extension identifier to the local telephony server;

a plurality of user account records to match the callee extension identifier to the callee telecommunications device; and a telephone connection controller operable to receive the callee extension identifier on the connection to the caller telecommunications device, the telephone connection controller operable to open a second PSTN connection between a callee gateway and the callee telecommunications device when the caller telecommunications device communicates the extension identifier to the local telephony server;

the telephone connection controller operable to open a voice-over-data channel between the caller and callee gateways, wherein a telephone connection between the callee and caller telecommunications devices includes the first and second PSTN connections and the voice-over-data channel.

3. A method for providing a telephone connection between a callee telecommunications device and a caller telecommunications device using a packet-switched network comprising the steps of:

storing an extension identifier corresponding to the callee telecommunications device and a callee gateway near the callee telecommunications device in a local service host;

initiating a data connection between the calling telecommunications device and the local service host by the steps of:

dialing a local access identifier at the calling telecommunications device to establish a first public-switched telephone network (PSTN) connection between the calling telecommunications device and a caller gateway; and connecting to the local service host from the caller gateway with a data connection comprising the first PSTN connection and the data communications channel;

dialing the extension identifier at the calling telecommunications device and sending to the local service host;

opening a voice-over-data channel between the caller gateway and the callee gateway to communicate voice signals from the caller and callee gateways as voice-over-data packets; and opening a second PSTN connection between the callee gateway and the callee telecommunications device;

wherein the telephone connection between the calling and callee telecommunications devices comprises the first PSTN connection, the voice-over-data channel and the second PSTN connection.

4. A method for providing telephony service by a data service provider comprising the steps of:

providing a telephony service host having a telephony service database to store a user account record having an extension identifier corresponding to a callee telecommunications device, the telephony service host being accessible by a caller telecommunications device communicating a local access identifier via a caller gateway; and providing a telephony connection controller to open a telephone connection between the caller and callee telecommunications devices using a method comprising the steps of:

receiving the extension identifier when the telephony service host connects to the caller telecommunications device in response to the local access identifier;

retrieving a telephone number corresponding to the extension identifier from the telephony service database;

retrieving a callee gateway identifier corresponding to a callee gateway near the callee telecommunications device;

opening a voice-over-data channel between the caller gateway and the callee gateway;

opening a second PSTN connection between the callee gateway and the callee telecommunications device; and communicating voice signals between the callee and the caller telecommunications devices over the telephone connection comprising the first PSTN connection, the voice-over-data channel and the second PSTN connection.

* * * * *